United States Patent
Barea et al.

(10) Patent No.: US 7,029,642 B2
(45) Date of Patent: Apr. 18, 2006

(54) CRYSTALLINE SOLID UVL-1 AND A PROCESS FOR HYDROCONVERTING/HYDROCRACKING HYDROCARBON FEEDS

(75) Inventors: Eva Barea, Valencia (ES); Patrick Bourges, Lyons (FR); Emmanuelle Guillon, Saint Genis Laval (FR); Patrick Euzen, Paris (FR); Vicente Fornes, Valencia (ES); Avelino Corma, Valence (ES)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/071,582

(22) Filed: Mar. 4, 2005

(65) Prior Publication Data
US 2005/0196335 A1    Sep. 8, 2005

(30) Foreign Application Priority Data
Mar. 5, 2004    (FR) .................................. 04 02326

(51) Int. Cl.
*C01B 33/38*    (2006.01)
(52) U.S. Cl. .................. 423/329.1; 423/328.2; 423/326; 208/109; 208/133
(58) Field of Classification Search ................ 423/326, 423/328.2, 718, 329.1; 208/109, 133
See application file for complete search history.

(56) References Cited

U.S. PATENT DOCUMENTS

| 4,954,325 A | 9/1990 | Rubin et al. |
| 5,250,277 A | 10/1993 | Kresge et al. |

(Continued)

FOREIGN PATENT DOCUMENTS

| WO | WO 92/11934 | 7/1992 |

(Continued)

OTHER PUBLICATIONS

G. Pal-Borbely and A. Auroux: "Acidity of Isomorphically Substituted Crystalline Acids With Layer Structure. I. H-Magadiite" Catalysis by Microporous Materials, Studiesin Surface Science and Catalysis, vol. 94, 1995, pp. 55-62.

(Continued)

*Primary Examiner*—David Sample
(74) *Attorney, Agent, or Firm*—Millen, White, Zelano & Branigan, P.C.

(57) ABSTRACT

The invention concerns a novel crystalline solid UVL-1 which has an X ray diffraction diagram containing at least the following characteristic peaks:

Figure 1:
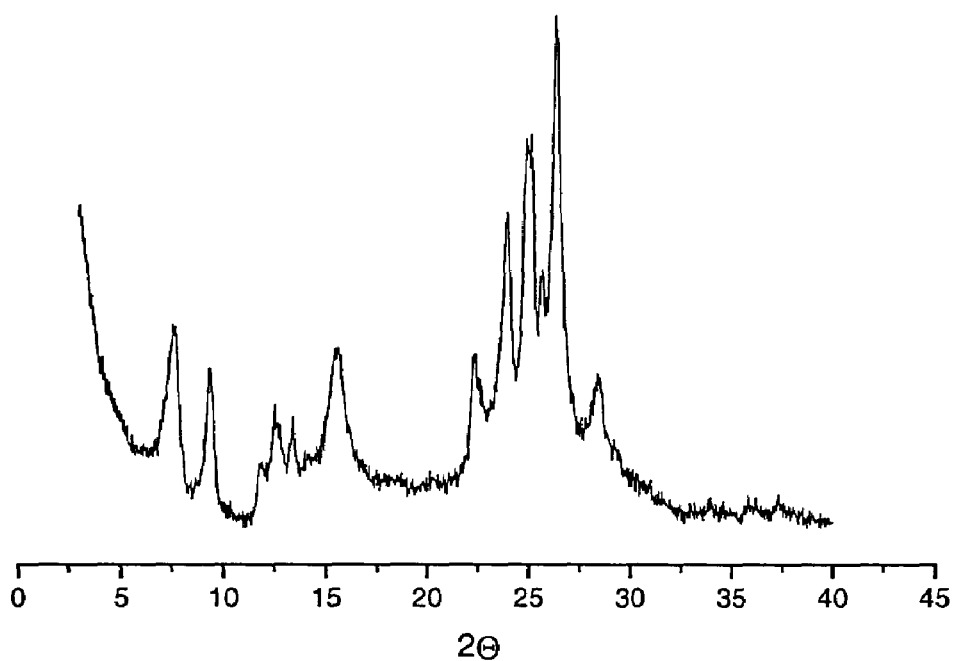

| $d_{hkl}$ (A) | 2theta (°) | $I/I_0$ |
|---|---|---|
| 11.69 | 7.55 | mw to vs |
| 7.50 | 11.79 | vw to w |
| 5.76 | 15.36 | w to mw |
| 3.70 | 24.00 | m to s |
| 3.57 | 24.91 | s |
| 3.36 | 26.49 | vs |
| 3.14 | 28.48 | w to mw |
| 2.50 | 35.88 | vw |
| 2.41 | 37.30 | vw | and with a chemical composition, expressed as the anhydrous compound, in terms of moles of oxide:

$(XO_2):(Y_2O_3)_m:(Z_{2/n}O)_p$ in which:
X represents at least one tetravalent element selected from the group formed by Si, Ge; Y represents at least one trivalent element selected from Al, B, Cr, Ga; Z represents at least one cation with valency n;
and in which:
n is in the range 2 to 4, m is in the range 0 to 0.2, preferably in the range 0 to 0.05, and p is in the range 0 to 0.2, preferably in the range 0 to 0.05.

The invention also concerns a hydrocracking/hydroconversion process and a hydrorefining process employing said solid in the catalyst composition.

20 Claims, 3 Drawing Sheets

U.S. PATENT DOCUMENTS

| | | | |
|---|---|---|---|
| 5,296,428 A | * | 3/1994 | Degnan et al. ............... 502/84 |
| 5,827,491 A | | 10/1998 | Fung et al. |
| 6,231,751 B1 | | 5/2001 | Canos et al. |
| 6,797,254 B1 | * | 9/2004 | Corma Canos et al. ..... 423/706 |

FOREIGN PATENT DOCUMENTS

| | | |
|---|---|---|
| WO | WO 97/17290 | 5/1997 |

OTHER PUBLICATIONS

Occelli M L et al: "Effects of Isomorphous Substitution of SI With TI and ZR in Mesoporous Silicates With the MCM-41 Structure" Applied Catalysis A: General, Elsevier Science, Amsterdam, NL, vol. 183, No. 2, Jul. 19, 1999, pp. 231-239.

Fudala A et al: "Preparation, Characterization and Application of the Magadiite Based Mesoporous Composite Material of Catlytic Interest" Microporous Mesoporous Mater: Microporous and Mesoporous Materials 2000 Elsevier Sci B.B., Nterherlands, vol. 35, 2000, pp. 631-641.

* cited by examiner

CRYSTALLINE SOLID UVL-1 AND A PROCESS FOR HYDROCONVERTING/HYDROCRACKING HYDROCARBON FEEDS

FIELD OF THE INVENTION

The present invention relates to a novel crystalline solid, hereinafter termed UVL-1, having a novel crystalline structure, and to a process for its preparation.

The invention also concerns hydrocracking/hydroconversion and hydrorefining/hydrotreatment processes employing the UVL-1 solid.

PRIOR ART

The search for novel crystalline solids has led to the synthesis of novel silicate type products that can produce significant progress in the field of catalysis.

Thus, U.S. Pat. No. B1-6,469,226 describes a material termed ITQ-6 obtained by delaminating a lamellar compound. After treating a lamellar solid with a solution containing a swelling agent, the solid is delaminated either under the effect of mechanical agitation, or by treatment with ultrasound. The crystalline solid ITQ-6 has a high specific surface area of more than 400 m$^2$/g. The ITQ-6 material is characterized by its X-ray diffraction diagram.

U.S. Pat. No. 5,137,861 describes a silicate modified by a particular calcining treatment. A lamellar material is treated with a swelling agent to move the lamellae away from each other. The material obtained is calcined to separate the lamellae from each other. Partial delamination of the lamellae is thus obtained by calcining. The principal peaks obtained by XRD of a material prepared in accordance with the operating protocol described by that patent are obtained at interplanar spacings of 17.5 Å to 3.4 Å.

DETAILED DESCRIPTION OF THE INVENTION

Characterization Techniques

The pore distribution measured by nitrogen adsorption was determined using the Barrett-Joyner-Halenda (BJH) model. The nitrogen adsorption-desorption isotherm according to the BJH model has been described in the periodical "The Journal of the American Society", 73, 373 (1951) written by E P Barrett, L G Joyner and P P Halenda. In the following description of the invention, the term "nitrogen adsorption volume" means the volume measured for $P/P_0=0.99$, the pressure at which it is accepted that the nitrogen has filled all of the pores. The "mean nitrogen desorption diameter" is defined as the diameter at which all pores with less than that diameter constitute 50% of the pore volume ($V_p$) measured on the desorption branch of the nitrogen isotherm.

The term "surface adsorption" means the surface area measured on the adsorption isotherm branch. Reference can, for example, be made to the article by A Lecloux in "Mémoires Société Royale des Sciences de Liége, 6$^{th}$ series, volume 1, no 4, pp 169–209 (1971)".

The technique used to characterize the solids of the invention is X ray diffraction. In the following description, powder X ray analysis was carried out using a diffractometer operating in reflection mode and provided with a back monochromator using the copper radiation line (wavelengths 1.5406 Å and 1.5444 Å). The interplanar spacing d was deduced from the angular position using the Bragg relationship ($2d_{(hkl)} * \sin(\theta)=n*\lambda$). From the position of the diffraction peaks represented by the angle $2\theta$, the Bragg relationship was used to calculate the characteristic interplanar spacing $d_{hkl}$ of the sample. The measurement error $\Delta(d_{hkl})$ on $d_{hkl}$ was estimated by the Bragg relationship as a function of the absolute error $\Delta(2\theta)$ made on the measurement of $2\theta$. An absolute error $\Delta(2\theta)$ of $\pm 0.2°$ is commonly accepted.

The relative intensity $I_{rel}$ for each value of $d_{hkl}$ was measured from the height of the corresponding diffraction peak, in which vs=very strong; m=medium; w=weak; s=strong; mw=medium weak; vw=very weak. The relative intensity $I/I_0$ was given with respect to a relative intensity scale to which a value of 100 was assigned to the most intense peak on the X ray diffraction diagram: vw<15; $15 \leq w<30$; $30 \leq mw<50$; $50 \leq m<65$; $65 \leq s<85$; $vs \geq 85$.

The solids of the invention were analyzed by solid $^{27}$Al NMR MAS spectrometry using a Brüiker MSL 400 spectrometer and a 4 mm probe. The rotation speed for the samples was of the order of 11 kHz. Aluminum NMR can potentially distinguish three types of aluminum; their chemical displacements are shown below:

between 100 and 40 ppm, aluminum is tetra-coordinated, $Al_{IV}$;

between 40 and 20 ppm, the aluminum is penta-coordinated, $Al_V$;

between 20 and −100 ppm, the aluminum is hexa-coordinated, $Al_{VI}$.

The aluminum atom is a quadripolar nucleus. Under certain analytical conditions (weak radiofrequency field: 30 kHz, low angle of momentum: $\pi/2$ and water-saturated sample), magic angle spinning NMR (MAS NMR) is a quantitative technique. Decomposition of MAS NMR spectra can directly lead to the quantity of the different species. The chemical displacement of the spectrum is offset with respect to a 1M aluminum nitrate solution. The aluminum signal is at zero ppm. We elected to integrate the signals between 100 and 20 ppm for $Al_{IV}$ and $Al_V$, corresponding to area 1, and between 20 and −100 ppm for $Al_{VI}$, corresponding to area 2.

In the following description, the term "proportion of octahedral $Al_{VI}$" means the following ratio: area 2/(area 1+area 2).

The acidity of a solid can be measured by IR. IR spectra were recorded using a Nicolet type 710 interferometer with a resolution of 4 cm$^{-1}$ with a Happ-Gensel type apodisation. The sample (10 mg) was pressed into a self-supported pellet and placed in an in situ analysis cell (25° C. to 550° C., furnace not in line with IR beam, 10$^{-6}$ mbar high vacuum). The pellet diameter was 13 mm.

The sample was pretreated as follows to eliminate physisorbed water and to partially dehydroxylate the surface of the catalyst to provide an image representative of the acidity of the working catalyst:

temperature ramp-up from 25° C. to 400° C. over 3 hours;

constant temperature stage of 10 hours at 400° C.;

temperature ramp-down from 400° C. to 25° C. over 3 hours.

The basic probe (pyridine) was then adsorbed at a saturating pressure at 25° C. then thermo-desorbed in the following stages:

150° C., 1 hour, high vacuum;

250° C., 1 hour, high vacuum;

350° C., 1 hour high vacuum.

A spectrum was recorded at 25° C. at the end of pretreatment and at each desorption stage in transmission mode with an accumulation period of 100 s. The spectra were brought to iso-mass (and thus assumed to be iso-thickness) (exactly 10 mg).

The number of Lewis sites is proportional to the surface area of the peak the maximum of which was at about 1450 cm$^{-1}$, any shoulders being included. The number of Brønsted sites is proportional to the surface area of the peak the maximum of which was at about 1545 cm$^{-1}$. The ratio of the number of Brønsted sites/number of Lewis sites was estimated to be equal to the ratio of the surface areas of the two peaks described above. In general, the surface area of the peaks at 25° C. was used. This ratio B/L was generally calculated from the spectrum recorded at 25° C. at the end of pre-treatment.

DESCRIPTION OF THE INVENTION

The invention concerns a novel crystalline solid termed crystalline solid UVL-1, having a novel crystalline structure. This novel crystalline structure is characterized by the presence of particular peaks in the X ray diffraction diagram.

Crystalline solid UVL-1 has an X ray diffraction diagram including at least the peaks described in Table 1 below:

TABLE 1

| $d_{hkl}$ (A) | 2theta (°) | I/I$_0$ |
|---|---|---|
| 11.69 | 7.55 | mw to vs |
| 7.50 | 11.79 | vw to w |
| 5.76 | 15.36 | w to mw |
| 3.70 | 24.00 | m to s |
| 3.57 | 24.91 | s |
| 3.36 | 26.49 | vs |
| 3.14 | 28.48 | w to mw |
| 2.50 | 35.88 | vw |
| 2.41 | 37.30 | vw | in which
vs = very strong;
m = medium;
w = weak;
s = strong;
mw = medium weak;
vw = very weak.

and with a chemical composition, expressed as the anhydrous compound in terms of moles of oxide defined by the following general formula:

(XO$_2$):(Y$_2$O$_3$)$_m$:(Z$_{2/n}$O)$_p$ in which:
X represents at least one tetravalent element selected from the group formed by Si, Ge, preferably Si, and optionally a mixture of Ge and Si;
Y represents at least one trivalent element selected from Al, B, Cr, Ga, preferably Al;
Z represents at least one cation with valency n, preferably selected from Ni, Zr, Co, Cu, Nb, Ti, Eu, In, preferably Ni, Co, Ti and more preferably Ni;
and in which n is in the range 2 to 4; m represents the number of moles of Y$_2$O$_3$, in which m is in the range 0 to 0.2, preferably in the range 0 to 0.05; and p represents the number of moles of Z$_{2/n}$O and p is in the range 0 to 0.2, preferably in the range 0 to 0.05.

In accordance with the invention, in a first preferred implementation, X is silicon and Y is aluminum; the crystalline solid UVL-1 of the invention is thus a crystalline aluminosilicate. The X ray diffraction diagram for said crystalline aluminosilicate has all of the diffraction peaks described in Table 1 and the following additional peaks at angles 2theta of 9.34°, 12.5°, 13.4°, 22.35°, 25.70°, 34.00°. The aluminosilicate type crystalline solid UVL-1 has an X ray diffraction diagram including at least the peaks shown in Table 2 below:

TABLE 2

| $d_{hkl}$ (A) | 2theta (°) | I/I$_0$ |
|---|---|---|
| 11.69 | 7.55 | mw |
| 9.45 | 9.34 | w |
| 7.50 | 11.79 | vw |
| 7.06 | 12.51 | w |
| 6.58 | 13.44 | w |
| 5.76 | 15.36 | w |
| 3.97 | 22.35 | w |
| 3.70 | 24.00 | m |
| 3.57 | 24.91 | s |
| 3.46 | 25.70 | mw |
| 3.36 | 26.49 | vs |
| 3.14 | 28.48 | w |
| 2.63 | 34.00 | vw |
| 2.50 | 35.88 | vw |
| 2.41 | 37.30 | vw | in which
vs = very strong;
m = medium;
w = weak;
s = strong;
mw = medium weak;
vw = very weak.
An absolute error Δ2θ of ±0.2° is commonly accepted.

NMR analysis of said crystalline aluminosilicate shows that the aluminum is all in the tetrahedral form, i.e., the aluminum is inserted into the framework of the material. The signal for aluminum has a peak at 50 ppm which is characteristic of tetrahedral aluminum.

In accordance with the invention, in a second preferred implementation, X is silicon and Z is cobalt; the crystalline solid UVL-1 of the invention is thus a crystalline cobalt silicate. The X ray diffraction diagram for said crystalline cobalt silicate has all of the diffraction peaks described in Table 1. The cobalt silicate type crystalline solid UVL-1 has an X ray diffraction diagram including at least the peaks shown in Table 3 below:

TABLE 3

| $d_{hkl}$ (A) | 2theta (°) | I/I$_0$ |
|---|---|---|
| 11.69 | 7.55 | mw |
| 7.50 | 11.79 | vw |
| 5.76 | 15.36 | w |
| 3.70 | 24.00 | m |
| 3.57 | 24.91 | s |
| 3.36 | 26.49 | vs |
| 3.14 | 28.48 | w |
| 2.50 | 35.88 | vw |
| 2.41 | 37.30 | vw | in which:
vs = very strong;
m = medium;
w = weak;
s = strong;
mw = medium weak;
vw = very weak.
An absolute error Δ2θ of ±0.2° is commonly accepted.

In accordance with the invention, in a third preferred implementation, X is silicon and Z is nickel; the crystalline solid UVL-1 of the invention is thus a crystalline nickel silicate. The X ray diffraction diagram for said crystalline nickel silicate has all of the diffraction peaks described in Table 1. The nickel silicate type crystalline solid UVL-1 has an X ray diffraction diagram including at least the peaks shown in Table 4 below:

TABLE 4

| $d_{hkl}$ (A) | 2theta (°) | I/$I_0$ |
|---|---|---|
| 11.69 | 7.55 | vs |
| 7.50 | 11.79 | vw |
| 5.76 | 15.36 | mw |
| 3.70 | 24.00 | m |
| 3.57 | 24.91 | s |
| 3.36 | 26.49 | vs |
| 3.14 | 28.48 | w |
| 2.50 | 35.88 | vw |
| 2.41 | 37.30 | vw | in which:
vs = very strong;
m = medium;
w = weak;
s = strong;
mw = medium weak;
vw = very weak.
An absolute error $\Delta 2\theta$ of ±0.2° is commonly accepted.

In accordance with the invention, in a fourth preferred implementation, X is silicon and Z is titanium; the crystalline solid UVL-1 of the invention is thus a crystalline titanium silicate. The X ray diffraction diagram for said crystalline titanium silicate has all of the diffraction peaks described in Table 1. The titanium silicate type crystalline solid UVL-1 has an X ray diffraction diagram including at least the peaks shown in Table 5 below:

TABLE 5

| $d_{hkl}$ (A) | 2theta (°) | I/$I_0$ |
|---|---|---|
| 11.69 | 7.55 | m |
| 7.50 | 11.79 | vw |
| 5.76 | 15.36 | w |
| 3.70 | 24.00 | s |
| 3.57 | 24.91 | s |
| 3.36 | 26.49 | vs |
| 3.14 | 28.48 | w |
| 2.50 | 35.88 | vw |
| 2.41 | 37.30 | vw | in which:
vs = very strong;
m = medium;
w = weak;
s = strong;
mw = medium weak;
vw = very weak.
An absolute error $\Delta 2\theta$ of ±0.2° is commonly accepted.

The BET surface area of the crystalline solid of the invention is over 80 m²/g, preferably in the range 150 to 700 m²/g and more preferably in the range 200 to 600 m²/g.

The acidity of the solid can be measured by IR spectrometry and is derived from the value of the ratio B/L (number of Brønsted sites/number of Lewis sites).

The invention also concerns a hydrotreatment/hydrorefining process and a hydrocracking/hydroconversion process using the solid of the invention.

Preparation Processes

A preferred process for preparing the catalyst of the present invention comprises the following steps:
a) synthesizing a lamellar crystalline solid. Said synthesis can be carried out, for example:
   by mixing a source of at least one tetravalent metal X, optionally a source of one or more other metals Y, optionally a source of one or more other metals Z, an alkaline metal L, an organic template H and water;
   X represents at least one tetravalent element selected from the group formed by Si, Ge, preferably Si, and optionally a mixture of Ge and Si. The metal X can be incorporated into the mixture in the form of an oxide, hydroxide, nitrate or others, such as $SiO_2$, $GeO_2$. In the preferred case in which X is silicon, the silica source may be a silicate, silica gel, colloidal silica and/or silicic acid;
   Y represents at least one trivalent element selected from Al, B, Cr, Ga, preferably Al. In the case in which Y is aluminum, the aluminum source can, for example, be $Al_2O_3$ or $Al(NO_3)_3$;
   Z represents at least one cation with valency n, preferably selected from Ni, Zn, Co, Cu, Nb, Ti, Eu and preferably Ni, Co, Ti. The metal Z may be incorporated into the mixture in the form of an oxide, hydroxide, carbonate or other compound such as $Ni(CH_3COO)_2$, $Zn(CH_3COO)_2$, $Co(CH_3COO)_2$, $Cu(CH_3COO)_2$, $Nb_2O_5$, $Ti(EtO)_4$, $Eu(CH_3COO)_2$;
   L is selected from the group formed by lithium, potassium, sodium, calcium. Sodium is preferred;
   H is an organic template having quaternary ammonium functions and/or amine functions and/or alcohol functions; preferably, H is an amino-alcohol;
   the mixture preferably has the following composition:

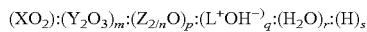

n is in the range 2 to 4;
   m is in the range 0 to 0.2, preferably in the range 0 to 0.05;
   p is in the range 0 to 0.2, preferably in the range 0 to 0.05;
   q is strictly more than 0, and less than 1, preferably in the range 0.1 to 0.6;
   r is generally more than 10;
   s is in the range 0.05 to 3, preferably in the range 0.2 to 1;
   by maintaining a high temperature, between 100° C. and 200° C., preferably between 135° C. and 175° C.;
   the synthesis period necessary to obtain a crystalline structure being in the range 1 to 20 days, preferably in the range 2 to 10 days.

Hydrothermal crystallization of the solid obtained is carried out using any method that is known to the skilled person, preferably in an autoclave. The reaction mixture can be vigorously agitated or otherwise during crystallization. Preferably, the crystalline lamellar solid obtained at the end of said step is of the magadiite type;
b) the crystalline solid is separated from the mixture using any method that is known to the skilled person, such as filtering. The solid is washed with water, preferably deionized, then dried between 50° C. and 150° C., preferably between 60° C. and 100° C., generally for a period of 12 h to 30 h. Drying is preferably carried out at atmospheric pressure, but can be carried out under pressure;
c) the solid is then treated with a solution containing a swelling agent under operating conditions that allow said swelling agent to be incorporated between the lamellae using any method known to the skilled person. Said treatment can increase the distance between the lamellae by incorporating a swelling agent. An example of the treatment with a solution containing a swelling agent is described in U.S. Pat. No. B1-6,469,226.

Examples of swelling agents that can be used are selected from quaternary alkyl ammonium hydroxides and/or chlorides and/or bromides, i.e. octyltrimethylammonium, dodecyltrimethylammonium, cetyltrimethylammonium, hexadecyltrimethylammonium or tetrapropylammonium, for example;

d) the swelled solid is then at least partially delaminated. Said delamination treatment is applied to the treated solid with a solution containing a swelling agent.

The term "delamination treatment" means any treatment that can substantially reduce the interactive forces between the lamellae to break the cohesion between the lamellae, to separate the lamellae from each other and to disperse the lamellae.

The delamination treatment is preferably a mechanical treatment (vigorous agitation) or the use of ultrasounds or any other method that is known to the skilled person falling within the above definition.

A suspension of the swelled solid is prepared in water in a ratio by weight between the water and the swelled solid in the range 4 to 200:1, preferably in the range 10 to 100:1 and more preferably in the range 20 to 60:1. This suspension is agitated using a controlled process to at least partially delaminate the swollen solid.

Delamination as defined above can be carried out using any delamination process known to the skilled person.

Preferably, delamination is carried out either mechanically, for example with strong agitation, or by treatment with ultrasound.

Delamination can be carried out by treating the suspension using one of the above treatments or by a combination of a plurality of said modes of treatment, for a period in the range 0.5 to 100 h, preferably in the range 1 to 20 hours.

Even partial delamination treatment may cause the system to gel, which renders filtering of the suspension difficult. To this end, an acid treatment may be carried out following the delamination treatment to encourage flocculation of the suspension. Flocculants, generally acidic such as HCl, HNO3 or acetic acid, may be added to encourage recovery of the dispersed solid.

e) the delaminated solid obtained may be dried at temperatures in the range 80° C. to 150° C.;

f) the solid may then be dried at temperatures in the range 300° C. to 800° C., preferably at temperatures in the range 400° C. to 600° C. The calcining treatment is generally carried out in a flow of gas (air, oxygen, for example).

The invention also concerns the crystalline solid obtained by the preparation process described above.

The material obtained is termed UVL-1. Said material has an X ray diffraction diagram including at least the peaks inscribed in Table 1.

Hydrocracking/hydroconversion and hydrotreatment processes

The invention also concerns hydrocracking/hydroconversion processes employing the solids of the invention in the catalyst composition, said processes encompassing the pressure and conversion fields of mild hydrocracking to high pressure hydrocracking. The term "mild hydrocracking" means moderate conversions, generally less than 40%, operating at low pressures, generally between 2 MPa and 6 MPa.

Generally, catalysts employing the solids of the invention in their composition are used to process hydrocarbon cuts. The catalysts employing the solids of the invention in their composition are advantageously used for hydrocracking and/or hydroconversion of hydrocarbon cuts.

The catalysts employing the solids of the invention in their composition also contain at least one hydrodehydrogenating element (generally at least one element from groups VIB and VIII, and usually at least one element from group VIB and at least one non noble element from group VIII).

The catalysts employing the solids of the invention in their composition can be used alone, in a single or a plurality of fixed catalytic beds, in one or more reactors, in a once-through hydrocracking scheme, with or without a liquid recycle of the unconverted fraction, optionally in association with a hydrorefining solid located upstream of the solid of the present invention.

The catalysts employing the solids of the invention in their composition can be used alone, in one or more ebullated bed reactors, in a once-through hydrocracking scheme, with or without a liquid recycle of the unconverted fraction, optionally in association with a hydrorefining catalyst located in a fixed bed or ebullated bed reactor upstream of the solid of the present invention.

The ebullated bed operates with withdrawal of the used catalyst and daily addition of fresh catalyst to preserve the activity of the stable catalyst.

In a two-step hydrocracking scheme with intermediate separation between the two reaction zones in a given step, the catalysts employing the solids of the invention in their composition may be used in one or two reactors which may or may not be associated with a hydrorefining catalyst located upstream of the solid of the present invention.

The operating conditions for hydrorefining such as temperature, pressure, hydrogen recycle rate and hourly space velocity, can vary widely as a function of the nature of the feed, the quality of the desired products and the facilities available to the refiner. The hydrocracking catalyst is brought into contact in the presence of hydrogen with the feeds described above at a temperature of more than 200° C., usually in the range 250° C. to 480° C., advantageously in the range 320° C. to 450° C., preferably in the range 330° C. to 435° C., at a pressure of more than 1 MPa, usually in the range 2 to 25 MPa, preferably in the range 3 to 20 MPa, the hourly space velocity being in the range 0.1 to 20 h$^{-1}$, preferably 0.1–6 h$^{-1}$, more preferably 0.2–3h$^{-1}$, and the quantity of hydrogen introduced is such that the volume ratio of the number of litres of hydrogen/litre of hydrocarbon is in the range 80 to 5000 l/l, usually in the range 100 to 2000 l/l.

These operating conditions used in the process of the invention can achieve conversions per pass into products with boiling points of less than 340° C. and preferably less than 370° C. of more than 15%, more preferably in the range 20% to 95%.

The invention also concerns hydrorefining and hydrotreatment processes employing the solids of the invention in the catalyst composition.

The catalysts employing the solids of the invention in their composition are used for hydrorefining and hydrotreatment of hydrocarbon feeds such as oil cuts, cuts from coal or hydrocarbons produced from natural gas, more particularly for hydrogenation, ring opening, hydrodenitrogenation, hydrodeoxygenation, hydrodearomatization, hydrodesulfurization and hydrodemetallization of hydrocarbon feeds containing aromatic compounds and/or olefinic compounds and/or napthenic compounds and/or paraffinic compounds, said feeds possibly containing metals and/or nitrogen and/or oxygen and/or sulfur.

More particularly, the feeds employed in the hydrorefining and hydrotreatment processes are gasolines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal or catalytic conversion processes, and mixtures thereof. They generally contain heteroatoms such as sulfur, oxygen and nitrogen and/or at least one metal.

As summarized above, The catalysts employing the solids of the invention in their composition may be used in a large number of hydrorefining or hydrotreatment applications. The catalysts employing the solids of the invention in their composition also contain at least one hydrodehydrogenating element (generally at least one element from groups VIB and VIII, and usually at least one element from group VIB and at least one non noble element from group VIII).

The usual operating conditions may be applied in said processes: a temperature of 180° C. to 450° C. (preferably 250° C. to 440° C.), a pressure of 0.5 to 30 MPa (preferably 1 to 18 MPa), an hourly space velocity of 0.1 to 20 $h^{-1}$ (preferably 0.2 to 5 $h^{-1}$), a hydrogen/feed ratio, expressed as the volume of hydrogen per volume of liquid feed, measured under normal temperature and pressure conditions, which is generally 50 l/l to 2000 l/l.

The following examples illustrate the present invention without, however, limiting its scope.

EXAMPLE 1

Preparation and Forming of a Solid S1 in Accordance with the Invention

A solution comprising 97% by weight of trans-4-aminocyclohexanol and silica (Ludox AS-40 sold by Aldrich) was incorporated into a basic sodium hydroxide NaOH solution (98% by weight), water and Al cation using the molar compositions described in Table 6 below.

TABLE 6

| Sample | Mixture composition (molar) |
|---|---|
| Al-magadiite | $SiO_2$: 0.2 NaOH 0.50 trans-4-aminocyclohexanol: 15 $H_2O$: 0.01 $Al_2O_3$ |

The mixture was agitated vigorously for two hours. The mixture was then transferred after homogenization into a Teflon liner which was then placed in a Teflon oven which was then placed in an autoclave.

The autoclave was heated for 3 days at 150° C. in an oven. During synthesis, the autoclave was agitated continuously. The crystalline product obtained was filtered, washed with deionized water (to achieve a neutral pH) then dried overnight at 60° C.

The crystalline product obtained was a lamellar madadiite type compound with an Si/Al ratio of 50. This product was then treated with a solution containing a swelling agent under operating conditions allowing said swelling agent to be incorporated between the lamellae.

A composition with the following composition by weight was prepared: 20% by weight of hexadecyltrimethylammonium, 8% by weight of tetrapropylammonium hydroxide, made up with deionized water.

The crystalline product obtained was introduced into said solution in the following proportions: 1 g of crystalline product, 30 g of solution.

The suspension obtained was kept at 95° C. for 16 h under reflux and with vigorous agitation. The suspension was subsequently washed with water until the liquid phase had separated from the solid obtained. The swollen solid obtained was then delaminated.

The following delamination treatment was applied to the solid treated with a solution containing a swelling agent.

The swollen solid was taken up in deionized water: 45 g of deionized water/g of swollen solid.

The suspension obtained after vigorous agitation was treated with ultrasound for one hour under the following conditions: ultrasound at a frequency of 50 Hz and a power of 50 watts. A 6M HCl acidic solution was added to this suspension until the pH reached 2. The suspension obtained after treatment with ultrasound was centrifuged (12000 rpm for 20 minutes). The solid obtained was washed with deionized water (to a neutral pH). The solid obtained was dried at 100° C. for 16 h then calcined at 580° C. for 7 h.

The aluminosilicate solid UVL-1 was thus obtained.

The diffractogram of the aluminosilicate solid UVL-1 is shown in FIG. 1. The X ray diffraction diagram for this crystalline aluminosilicate had all of the diffraction peaks described in Table 1 and the following additional peaks at angles 2theta of 9.34°, 12.5°, 13.4°, 22.35°, 25.70° and 34.00°.

Figure 2:
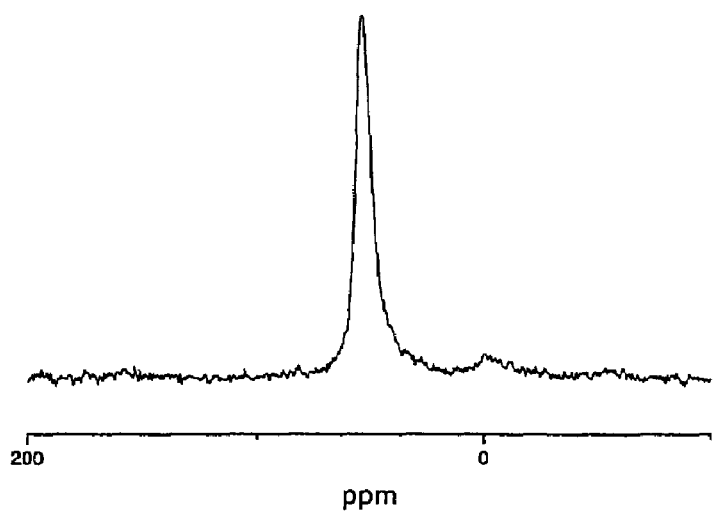

The aluminosilicate type solid UVL-1 obtained had the following characteristics:
  specific surface area of 230 $m^2/g$;
  Si/Al atomic ratio, obtained by atomic absorption, of 50;
  all of the aluminum was in tetrahedral coordination, as shown by the $^{27}Al$ NMR spectrum (FIG. 2);
  Brønsted and Lewis acidity, determined by IR following pyridine absorption. The results are shown in Table 7 below.

TABLE 7

| Temperature (° C.) | Bronsted acidity (mmol Py/g) | Lewis acidity (mmol Py/g) | Brønsted/Lewis ratio |
|---|---|---|---|
| 150 | 14.5 | 4.2 | 3.4 |
| 250 | 11.7 | 3.3 | 3.5 |
| 350 | 8.5 | 3.9 | 2.1 |

EXAMPLE 2

Preparation and Forming of a Solid S2 in Accordance with the Invention with Co Metal A solution comprising 97% by weight of trans-4-aminocyclohexanol and silica (Ludox AS-40 sold by Aldrich) was incorporated into a basic sodium hydroxide NaOH solution (98% by weight), water and Co cation using the molar compositions described in Table 8 below.

TABLE 8

| Sample | Mixture composition (molar) |
|---|---|
| Co-magadiite | $SiO_2$: 0.2 NaOH 0.50 trans-4-aminocyclohexanol: 15 $H_2O$: 0.02 $Co(CH_3COO)_2$ |

The mixture was agitated vigorously for two hours. The mixture was then transferred after homogenization into a Teflon liner which was then placed in a Teflon oven which was then placed in an autoclave.

The autoclave was heated for 3 days at 150° C. in an oven. During synthesis, the autoclave was agitated continuously. The crystalline product obtained was filtered, washed with deionized water (to achieve a neutral pH) then dried overnight at 60° C.

The crystalline product obtained was a lamellar madadiite type compound with an Si/Co ratio of 50. This product was then treated with a solution containing a swelling agent under operating conditions allowing said swelling agent to be incorporated between the lamellae.

A composition with the following composition by weight was prepared: 20% by weight of hexadecyltrimethylammonium, 8% by weight of tetrapropylammonium hydroxide, made up with deionized water.

The crystalline product obtained was introduced into said solution in the following proportions: 1 g of crystalline product, 30 g of solution.

The suspension obtained was kept at 95° C. for 16 h under reflux and with vigorous agitation. The suspension was subsequently washed with water until the liquid phase had separated from the solid obtained. The swollen solid obtained was then delaminated.

The following delamination treatment was applied to the solid treated with a solution containing a swelling agent.

The swollen solid was taken up in deionized water: 45 g of deionized water/g of swollen solid.

The suspension obtained after vigorous agitation was treated with ultrasound for one hour under the following conditions: ultrasound at a frequency of 50 Hz and a power of 50 watts. A 6M HCl acidic solution was added to this suspension until the pH reached 2. The suspension obtained after treatment with ultrasound was centrifuged (12000 rpm for 20 minutes). The solid obtained was washed with deionized water (to a neutral pH). The solid obtained was dried at 100° C. for 16 h then calcined at 580° C. for 7 h.

The solid UVL-1 was thus obtained.

Figure 3:
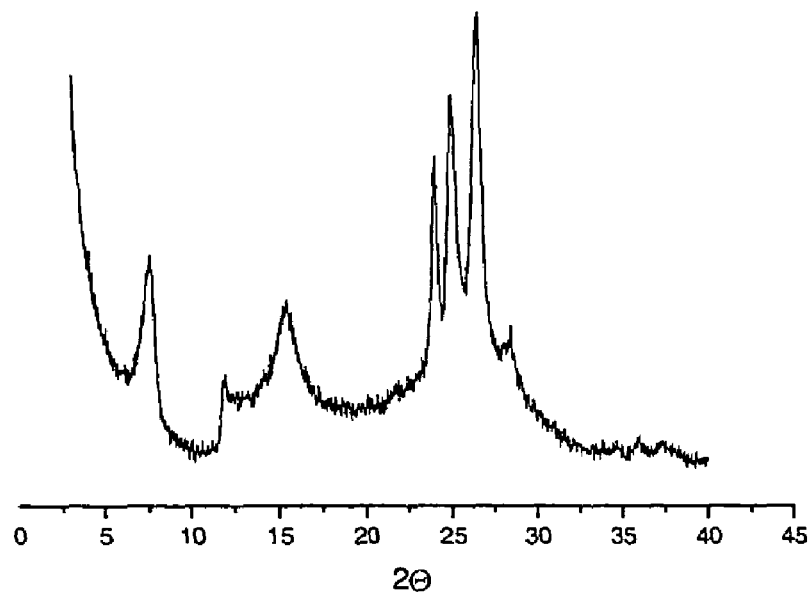

The diffractogram of the UVL-1 cobalt silicate type solid is shown in FIG. 3.

The solid UVL-1 obtained had the following characteristics:
specific surface area of 214 m$^2$/g;
Si/Co atomic ratio obtained by XF of 50.

EXAMPLE 3

Preparation and forming of a solid S2 in accordance with the invention with Ti metal A solution comprising 97% by weight of trans-4-aminocyclohexanol and silica (Ludox AS-40 sold by Aldrich) was incorporated into a basic sodium hydroxide NaOH solution (98% by weight), water and Ti cation using the molar compositions described in Table 9 below.

TABLE 9

| Sample | Mixture composition (molar) |
|---|---|
| Ti-magadiite | SiO$_2$: 0.2 NaOH 0.50 trans-4-aminocyclohexanol: 15 H$_2$O: 0.01 Ti(EtO)$_4$ |

The mixture was agitated vigorously for two hours. The mixture was then transferred after homogenization into a Teflon liner which was then placed in a Teflon oven which was then placed in an autoclave.

The autoclave was heated for 3 days at 150° C. in an oven. During synthesis, the autoclave was agitated continuously. The crystalline product obtained was filtered, washed with deionized water (to achieve a neutral pH) then dried overnight at 60° C.

The crystalline product obtained was a lamellar madadiite type compound with an Si/Ti ratio of 100. This product was then treated with a solution containing a swelling agent under operating conditions allowing said swelling agent to be incorporated between the lamellae.

A composition with the following composition by weight was prepared: 20% by weight of hexadecyltrimethylammonium, 8% by weight of tetrapropylammonium hydroxide, made up with deionized water.

The crystalline product obtained was introduced into said solution in the following proportions: 1 g of crystalline product, 30 g of solution.

The suspension obtained was kept at 95° C. for 16 h under reflux and with vigorous agitation. The suspension was subsequently washed with water until the liquid phase had separated from the solid obtained. The swollen solid obtained was then delaminated.

The following delamination treatment was applied to the solid treated with a solution containing a swelling agent.

The swollen solid was taken up in deionized water: 45 g of deionized water/g of swollen solid.

The suspension obtained after vigorous agitation was treated with ultrasound for one hour under the following conditions: ultrasound at a frequency of 50 Hz and a power of 50 watts. A 6M HCl acidic solution was added to this suspension until the pH reached 2. The suspension obtained after treatment with ultrasound was centrifuged (12000 rpm for 20 minutes). The solid obtained was washed with deionized water (to a neutral pH). The solid obtained was dried at 100° C. for 16 h then calcined at 580° C. for 7 h.

The solid UVL-1 was thus obtained.

Figure 4:
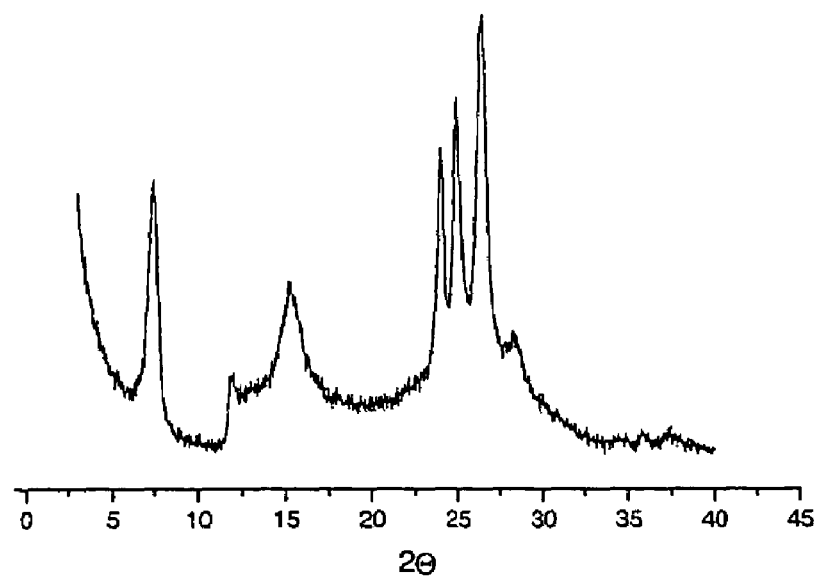

The diffractogram of the solid UVL-1 containing titanium is shown in FIG. 4.

The solid UVL-1 obtained had the following characteristics:
specific surface area of 160 m$^2$/g;
Si/Ti atomic ratio obtained by atomic absorption of 100.

EXAMPLE 4

Preparation and forming of a solid S4 in accordance with the invention with Ni metal A solution comprising 97% by weight of trans-4-aminocyclohexanol and silica (Ludox AS-40 sold by Aldrich) was incorporated into a basic sodium hydroxide NaOH solution (98% by weight), water and Ni cation using the molar compositions described in Table 10 below.

TABLE 10

| Sample | Mixture composition (molar) |
|---|---|
| Ni-magadiite | SiO$_2$: 0.2 NaOH 0.50 trans-4-aminocyclohexanol: 15 H$_2$O: 0.02 Ni(CH$_3$COO)$_2$ |

The mixture was agitated vigorously for two hours. The mixture was then transferred after homogenization into a Teflon liner which was then placed in a Teflon oven which was then placed in an autoclave.

The autoclave was heated for 3 days at 150° C. in an oven. During synthesis, the autoclave was agitated continuously. The crystalline product obtained was filtered, washed with deionized water (to achieve a neutral pH) then dried overnight at 60° C.

The crystalline product obtained was a lamellar madadiite type compound with an Si/Ni ratio of 50. This product was then treated with a solution containing a swelling agent under operating conditions allowing said swelling agent to be incorporated between the lamellae.

A composition with the following composition by weight was prepared: 20% by weight of hexadecyltrimethylammonium, 8% by weight of tetrapropylanirnmium hydroxide, made up with deionized water.

The crystalline product obtained was introduced into said solution in the following proportions: 1 g of crystalline product, 30 g of solution.

The suspension obtained was kept at 95° C. for 16 h under reflux and with vigorous agitation. The suspension was subsequently washed with water until the liquid phase had separated from the solid obtained. The swollen solid obtained was then delaminated.

The following delamination treatment was applied to the solid treated with a solution containing a swelling agent.

The swollen solid was taken up in deionized water: 45 g of deionized water/g of swollen solid.

The suspension obtained after vigorous agitation was treated with ultrasound for one hour under the following conditions: ultrasound at a frequency of 50 Hz and a power of 50 watts. A 6M HCl acidic solution was added to this suspension until the pH reached 2. The suspension obtained after treatment with ultrasound was centrifuged (12000 rpm for 20 minutes). The solid obtained was washed with deionized water (to a neutral pH). The solid obtained was dried at 100° C. for 16 h then calcined at 580° C. for 7 h.

The solid UVL-1 was thus obtained.

Figure 5:
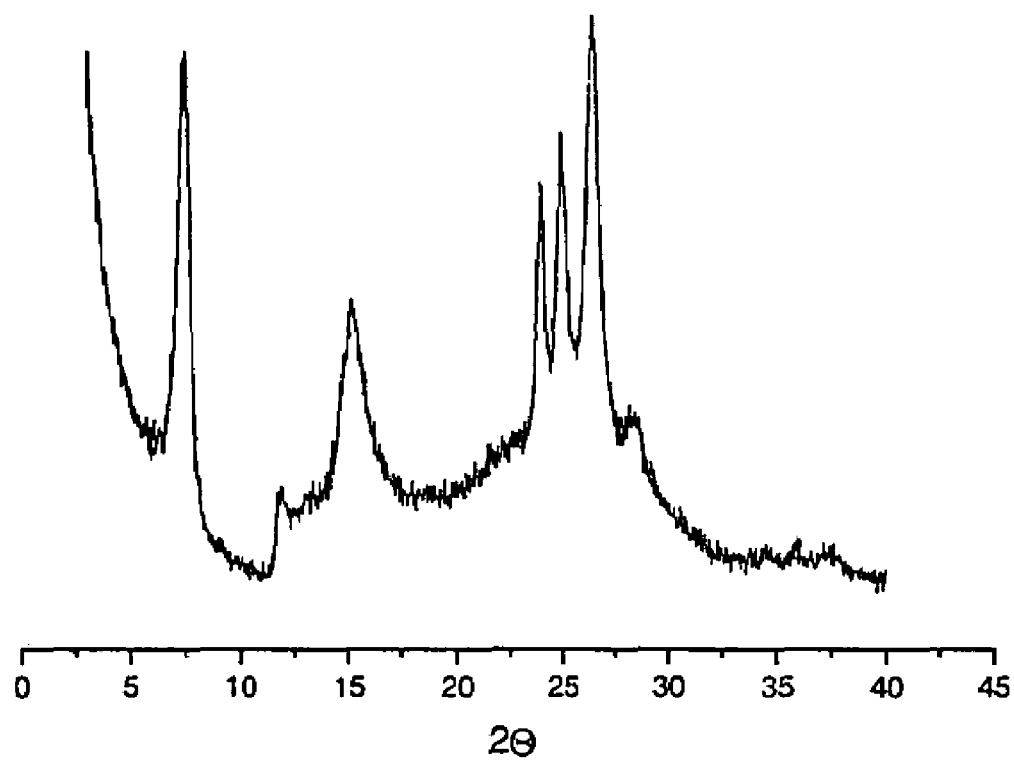

The diffractogram of the solid UVL-1 containing nickel is shown in FIG. 5.

The aluminosilicate type solid UVL-1 obtained had the following characteristics:
specific surface area of 188 $m^2/g$;
Si/Ni atomic ratio obtained by atomic absorption of 50.

EXAMPLE 5

Catalytic activity test for solid S1 in accordance with the invention

Aluminosilicate type solid S1 of the invention was evaluated by hydrocracking n-hexadecane.

Aluminosilicate type solid S1 with Si/Al=50 prepared using the protocol described in Example 1 was impregnated with a solution of hexachloroplatinic acid. The platinum content obtained after dry impregnation was 1% by weight.

A reference catalyst was prepared from a commercial ASA-25 silica-alumina with a silica content of 25% by weight. The ASA-25 silica-alumina was dry impregnated with a solution of hexachloroplatinic acid to obtain a platinum content of 1% by weight.

The dry impregnated catalysts were then dried at 100° C. for 3 h and calcined in a muffle furnace at 500° C. for 3 hours.

The Pt/S1 and Pt/ASA-25 catalysts obtained were evaluated by hydrocracking n-hexadecane (n-C16). The hydrocracking test was carried out in a continuous flow, fixed catalyst bed reactor. The catalysts were reduced in situ prior to carrying out the hydrocracking test. Reduction was carried out at atmospheric pressure in a continuous stream of pure $H_2$ (150 $cm^3$. $min^{-1}$. $g^{-1}$ of catalyst), at 150° C. for 2 hours. The hydrocracking tests were carried out at total pressure of 4.0 MPa, at a temperature of 300° C. in a stream of hydrogen and n-hexadecane, with a $H_2$/n-C16 mole ratio of 90, with a n-hexadecane flow rate of 3.5 g/g of catalyst. The results obtained are shown in Table 11. The catalyst prepared from solid S1 of the invention had a higher conversion activity for n-C16 than the activity obtained with the catalyst prepared from silica-alumina. The catalyst prepared from the solid S1 of the invention had a substantially higher selectivity for cracking products than the selectivity obtained with the catalyst prepared from silica-alumina. The catalyst S1 of the invention had a higher n-C16 hydrocracking activity than the activity obtained with the catalyst prepared from silica-alumina.

TABLE 11

| | Conversion of n-C16, % | Yield of n-C16 isomerization products, % | Yield of n-C16 cracking products, % | Cracking selectivity, % |
|---|---|---|---|---|
| Pt/S1 | 85 | 4 | 81 | 95 |
| Pt/ASA-25 | 70 | 36 | 34 | 48 |

The invention claimed is:

1. A crystalline solid UVL-1 having an X ray diffraction diagram including at least the peaks described in the table below:

| $d_{hkl}$ (A) | 2theta (°) | $I/I_0$ |
|---|---|---|
| 11.69 | 7.55 | mw to vs |
| 7.50 | 11.79 | vw to w |
| 5.76 | 15.36 | w to mw |
| 3.70 | 24.00 | m to s |
| 3.57 | 24.91 | s |
| 3.36 | 26.49 | vs |
| 3.14 | 28.48 | w to mw |
| 2.50 | 35.88 | vw |
| 2.41 | 37.30 | vw | in which vs = very strong;
m = medium;
w = weak;
s = strong;
mw = medium weak;
vw = very weak.

and with the following chemical composition, expressed as the anhydrous compound in terms of moles of oxide:

$(XO_2):(Y_2O_3)_m:(Z_{2/n}O)_p$

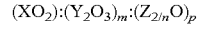

in which:
X represents at least one tetravalent element selected from the group formed by Si, Ge;
Y represents at least one trivalent element selected from Al, B, Cr, Ga; Z represents at least one cation with valency n; and in which:
n is in the range 2 to 4; m is in the range 0 to 0.2; and p is in the range 0 to 0.2.

2. A crystalline solid UVL-1 according to claim 1, in which m and p are in the range 0 to 0.05.

3. A crystalline solid UVL-1 according to claim 1, in which the tetravalent element X is silicon.

4. A crystalline solid UVL-1 according to claim 1, in which the trivalent element Y is aluminum.

5. A crystalline solid UVL-1 according to claim 1, in which the cation Z with valency n is selected from the group formed by Ni, Zr, Co, Cu, Nb, Ti, Eu, In.

6. A crystalline solid UVL-1 according to claim 1, in which the cation Z with valency n is Ni.

7. A crystalline solid according to claim 1, in which X is silicon and Y is aluminum and which has an X ray diffraction diagram including at least the following peaks:

| $d_{hkl}$ (A) | 2theta (°) | $I/I_0$ |
|---|---|---|
| 11.69 | 7.55 | mw |
| 9.45 | 9.34 | w |
| 7.50 | 11.79 | vw |
| 7.06 | 12.51 | w |
| 6.58 | 13.44 | w |
| 5.76 | 15.36 | w |
| 3.97 | 22.35 | w |
| 3.70 | 24.00 | m |
| 3.57 | 24.91 | s |
| 3.46 | 25.70 | mw |
| 3.36 | 26.49 | vs |
| 3.14 | 28.48 | w |
| 2.63 | 34.00 | vw |
| 2.50 | 35.88 | vw |
| 2.41 | 37.30 | vw | in which vs = very strong;
m = medium;
w = weak;
s = strong;
mw = medium weak;
vw = very weak.

8. A crystalline solid according to claim 1, in which X is silicon and Z is cobalt and which has an X ray diffraction diagram including at least the following peaks:

| $d_{hkl}$ (A) | 2theta (°) | $I/I_0$ |
|---|---|---|
| 11.69 | 7.55 | mw |
| 7.50 | 11.79 | vw |
| 5.76 | 15.36 | w |
| 3.70 | 24.00 | m |
| 3.57 | 24.91 | s |
| 3.36 | 26.49 | vs |
| 3.14 | 28.48 | w |
| 2.50 | 35.88 | vw |
| 2.41 | 37.30 | vw | in which vs = very strong;
m = medium;
w = weak;
s = strong;
mw = medium weak;
vw = very weak.

9. A crystalline solid according to claim 1, in which X is silicon and Z is nickel and which has an X ray diffraction diagram including at least the following peaks:

| $d_{hkl}$ (A) | 2theta (°) | $I/I_0$ |
|---|---|---|
| 11.69 | 7.55 | vs |
| 7.50 | 11.79 | vw |
| 5.76 | 15.36 | mw |
| 3.70 | 24.00 | m |
| 3.57 | 24.91 | s |
| 3.36 | 26.49 | vs |
| 3.14 | 28.48 | w |

-continued

| $d_{hkl}$ (A) | 2theta (°) | $I/I_0$ |
|---|---|---|
| 2.50 | 35.88 | vw |
| 2.41 | 37.30 | vw | in which vs = very strong;
m = medium;
w = weak;
s = strong;
mw = medium weak;
vw = very weak.

10. A crystalline solid according to claim 1, in which X is silicon and Z is titanium and which has an X ray diffraction diagram including at least the following peaks:

| $d_{hkl}$ (A) | 2theta (°) | $I/I_0$ |
|---|---|---|
| 11.69 | 7.55 | m |
| 7.50 | 11.79 | vw |
| 5.76 | 15.36 | w |
| 3.70 | 24.00 | s |
| 3.57 | 24.91 | s |
| 3.36 | 26.49 | vs |
| 3.14 | 28.48 | w |
| 2.50 | 35.88 | vw |
| 2.41 | 37.30 | vw | in which vs = very strong;
m = medium;
w = weak;
s = strong;
mw = medium weak;
vw = very weak.

11. A crystalline solid UVL-1 according to claim 1, having a BET specific surface area of more than 80 m²/g.

12. A crystalline solid UVL-1 according to claim 11, having a BET specific surface area in the range 150 m²/g to 700 m²/g.

13. A crystalline solid UVL-1 according to claim 12, having a BET specific surface area in the range 200 m²/g to 600 m²/g.

14. A process for preparing a crystalline solid according to claim 1 comprising the following steps:
  a) synthesizing a lamellar crystalline solid by mixing a source of at least one tetravalent metal X, optionally a source of one or more other metals Y, optionally a source of one or more other metals Z, an alkaline metal L, an organic template H and water;
  X represents at least one tetravalent element selected from the group formed by Si, Ge;
  Y represents at least one trivalent element selected from the group formed by Al, B, Cr, Ga;
  Z represents at least one cation with valency n;
  L is selected from the group formed by lithium, potassium, sodium, calcium;
  H is an organic template having quaternary ammonium functions and/or amine functions and/or alcohol functions;
  the mixture having the following composition:

$(XO_2):(Y_2O_3)_m:(Z_{2/n}O)_p:(L^+OH^-)_q:(H_2O)_r:(H)_s$ n is in the range 2 to 4;
  m is in the range 0 to 0.2;
  p is in the range 0 to 0.2;
  q is strictly more than 0 and less than 1;
  r is generally more than 10;
  s is in the range between 0.05 and 3;

at a high temperature, between 100° C. and 200° C.; for a synthesis period in the range 1 to 20 days followed by hydrothermal crystallization of the solid obtained;

b) separating, washing with water and drying the crystalline solid between 50° C. and 150° C.;

c) treating the crystalline solid with a solution containing a swelling agent;

d) at least partially delaminating the swelled solid.

15. A preparation process according to claim 14, in which the delamination treatment of step d) is carried out employing a means selected from the following treatments carried out alone or in combination: mechanical treatment and ultrasound treatment.

16. A preparation process according to claim 14, in which the delamination treatment of step d) is followed by an acid treatment.

17. A preparation process according to claim 14, in which a step e) for drying at a temperature in the range 80° C. to 150° C. follows the delamination treatment of step d).

18. A preparation process according to claim 17, in which a calcining step f) carried out at a temperature in the range 300° C. to 800° C., follows the drying step.

19. A preparation process according to claim 14, in which the lamellar crystalline solid obtained in step a) is of the magadiite type.

20. In a process comprising conducting a catalytic hydrocracking and/or hydroreforming reaction, the improvement wherein the catalyst comprises a crystalline solid according to claim 1.

* * * * *

UNITED STATES PATENT AND TRADEMARK OFFICE
CERTIFICATE OF CORRECTION

PATENT NO. : 7,029,642 B2
APPLICATION NO. : 11/071582
DATED : April 18, 2006
INVENTOR(S) : Barea et al.

It is certified that error appears in the above-identified patent and that said Letters Patent is hereby corrected as shown below:

On the Title page, Item [75] Inventors: line 2, reads "Lyons" should read -- Lyon --
Column 16, line 62, reads "range2to4;" should read -- range 2 to 4; --

Signed and Sealed this

Twenty-sixth Day of December, 2006

JON W. DUDAS
*Director of the United States Patent and Trademark Office*